United States Patent
Stoerkle et al.

(10) Patent No.: US 9,926,387 B2
(45) Date of Patent: Mar. 27, 2018

(54) CONTINUOUS OR SEMI-CONTINUOUS FREEZING COAGULATION METHOD FOR AQUEOUS POLYMER DISPERSIONS

(71) Applicant: Evonik Roehm GmbH, Darmstadt (DE)

(72) Inventors: Dominic Stoerkle, Shanghai (CN); Andreas Weber, Frankfurt (DE); Johannes Vorholz, Alzenau (DE); Melanie Jungkamp, West Lafayette, IN (US); Marcus Denger, Brensbach (DE); Norbert Hoffmann, Griesheim (DE); Mona Rueppel, Hoechst (DE); Reiner Mueller, Biebesheim (DE); Klaus Albrecht, Mainz (DE)

(73) Assignee: Evonik Roehm GmbH, Darmstadt (DE)

( * ) Notice: Subject to any disclaimer, the term of this patent is extended or adjusted under 35 U.S.C. 154(b) by 0 days.

(21) Appl. No.: 15/038,215

(22) PCT Filed: Nov. 6, 2014

(86) PCT No.: PCT/EP2014/073889
§ 371 (c)(1),
(2) Date: May 20, 2016

(87) PCT Pub. No.: WO2015/074883
PCT Pub. Date: May 28, 2015

(65) Prior Publication Data
US 2016/0280809 A1    Sep. 29, 2016

(30) Foreign Application Priority Data

Nov. 20, 2013 (EP) .................................. 13193654

(51) Int. Cl.
*C08F 6/22* (2006.01)
(52) U.S. Cl.
CPC ..................................... *C08F 6/22* (2013.01)
(58) Field of Classification Search
None
See application file for complete search history.

(56) References Cited

U.S. PATENT DOCUMENTS 2,187,146 A    1/1940  Calcott et al.
4,591,632 A    5/1986  Moore
(Continued)

FOREIGN PATENT DOCUMENTS

CN    1257527 C    5/2006

OTHER PUBLICATIONS

Elvers, Barbara et al., "Nitrile Rubber (NBR) Properties, Grades, and Applications Ed" Ullmann's Encyclopedia of Industrial Chemistry, Fifth Completely Revised Edition, vol. A23, Refractory Ceramics to Silicon Carbide, (Jan. 1993), XP008058991, 8 pages.
(Continued)

*Primary Examiner* — Richard A Huhn
(74) *Attorney, Agent, or Firm* — Oblon, McClelland, Maier & Neustadt, L.L.P.

(57) ABSTRACT

The present invention relates to a continuous or semi-continuous freeze coagulation process for aqueous polymer dispersions, wherein said process comprises a freezing step and a solid-liquid separation step and is further characterized in that it comprises the further step of admixing water and/or water vapor between the freezing step and the solid-liquid separation step.

15 Claims, 2 Drawing Sheets

(56) References Cited

U.S. PATENT DOCUMENTS

| | | |
|---|---|---|
| 4,857,631 A | 8/1989 | Moore |
| 2003/0010454 A1 | 1/2003 | Bailey, III et al. |
| 2006/0281946 A1 | 12/2006 | Morita et al. |
| 2009/0298984 A1 | 12/2009 | Morita et al. |

OTHER PUBLICATIONS

International Search Report dated Feb. 5, 2015, in PCT/EP2014/073889 filed Nov. 6, 2014.
European Search Report dated Apr. 22, 2014, in Europe Application 13193654.4 filed Nov. 20, 2013.

CONTINUOUS OR SEMI-CONTINUOUS FREEZING COAGULATION METHOD FOR AQUEOUS POLYMER DISPERSIONS

The present invention relates to a continuous or semi-continuous freeze coagulation process for aqueous polymer dispersions.

A "continuous" freeze coagulation process herein is a process with a continuous mass flow in respect of the freezing step, i.e. a continuous in- and outflow.

A "semi-continuous" freeze coagulation process herein is a process where the steps of filling, freezing and discharging take place in succession. The mass flow therein is preferably continuous in respect of the freezing step, i.e. there is a continuous in- and outflow averaged over a time of 5 hours, preferably averaged over a time of 3 hours, more preferably averaged over a time of 1 hour.

BACKGROUND OF THE INVENTION

Many polymers and particularly impact-modifying agents for polymers are formed by homo- or copolymerizing suitable monomers in a liquid medium by suspension, emulsion or precipitation polymerization. The polymer is formed therein as a usually aqueous dispersion of solids (latex) whence the polymer has to be removed if the latex is not used as such.

The polymer is typically removed from the dispersion by coagulation followed by a solid-liquid separation. Various methods are known for this, as described in Houben-Weyl, Methoden der organischen Chemie. Methods of removal can be subdivided into three main groups:

a) removing the aqueous phase in gaseous form
b) removing the aqueous phase in liquid form by admixture of auxiliaries
c) removing the aqueous phase in liquid form without admixture of auxiliaries With a) and b) there is an in-principle problem in that the quality of the plastic can be impaired, since auxiliaries for the polymerization (e.g. emulsifiers) and/or the auxiliaries for the removal process can remain in the polymer to some extent and thus may cause adverse secondary reactions, for example yellowing or haze, in the later plastics molding.

DE 19718597 C1 describes a two-step process for dewatering synthetic resin dispersions comprising a) coagulating the two-phase liquid mixture in a first extruder and b) dewatering the coagulate in a second extruder.

U.S. Pat. No. 4,591,632 describes the process of freeze coagulation on cold surfaces.

Freeze Coagulation of ABS Latex, Adler et al., Ind. Eng. Chem. Res. 1997, 36, 2156, describes the freeze coagulation of ABS latices by contact with a cold surface and with liquid $CO_2$.

DE 32 30 128 A1, "Freeze Coagulation of Polymer dispersions", Bayer Lev., 1982, describes the process of freeze coagulation by application of shear stress to a moving layer of product.

EP 0467288 B1 describes the discontinuous freeze coagulation of acrylic polymer latices whence plastics moldings having good optical properties and good haze characteristics on exposure to water are obtainable. It is reported therein that freezing rates of 4 cm/hour or less are preferable, since these conditions make good solid-liquid separation possible and thus make it possible to co-remove auxiliaries for the polymerization (e.g. emulsifiers).

Problem and Solution

In view of the prior art indicated and discussed herein, it is an object of the present invention to provide a freeze coagulation process that is continuous or semi-continuous as compared with the discontinuous freeze coagulation process known from the prior art.

It is a further object that the process to be provided should be suitable for the control of product properties.

It is an additional object to provide a process whose products have superior optical properties, in particular better haze values as per ASTM D 1003 (1997), in particular after hot water storage at 70° C. and 80° C., than products obtainable as per prior art processes. It is a particular object to obtain semi-finished products, preferably transparent semi-finished products, each made using process product from the process to be made available, which have an ASTM 1003 (1997) haze of <20%, preferably <15%, after hot water storage at 70° C., preferably after hot water storage at 80° C.

These objects and also further objects which, although not explicitly defined are derivable or apparent from the context discussed herein, are surprisingly achieved by a continuous or semi-continuous freeze coagulation process for an aqueous polymer dispersion, comprising a freezing step and a solid-liquid separation step, characterized in that the process comprises a further step of:

admixing water and/or water vapor between the freezing step and the solid-liquid separation step, wherein the solid-liquid separation step is defined by a separation factor P as per the formula $$P = \frac{m_{H2O,mech}}{m_{H2O,tot}}$$

where $m_{H2O,mech}$ represents the mechanically removed amount of water, i.e. the amount of aqueous phase removed, and $m_{H2O,tot}$ represents the total amount of water resulting from summing of the water i.e. the aqueous phase from the originally used aqueous polymer dispersion and the added water and/or water vapor, and wherein P is ≥0.55, preferably ≥0.8, more preferably ≥0.93, and even more preferably ≥0.95.

This process of the present invention provides control over certain product properties through certain processing parameters such as, for example, freezing rate, sintering temperature and proportion of removed water/aqueous phase.

The advantage of the present invention is that the control over and hence the optimization of the residual moisture content, the coagulum stability and the performance properties (haze) is possible through varying the processing parameters of roll temperature $T_W$, (roll) speed $n_W$, roll immersion depth $h_{dip}$ and the sintering temperature T. This is a decisive advantage over all processes involving static (discontinuous) freezing (in containers). These processes involving static (discontinuous) freezing provide only a very limited and economically non-optimal controllability via the external temperature and the container geometry. In addition, the process of the present invention gives better optical properties than the prior art process.

BRIEF DESCRIPTION OF FIGURES

Working examples and results of the process according to the present invention are depicted in the figures which follow and are hereby described. In the drawings

FIG. 1 Reference Sign List

| | |
|---|---|
| 1 | Dispersion |
| 2 | Freezing |
| 3 | Water and/or water vapor |
| 4 | Heating/stabilizing |
| 5 | Water and/or water vapor |
| 6 | Offgas |
| 7 | Buffering container (optional) |
| 8 | Solid-liquid separation |
| 9 | Wastewater (with solids fraction) |
| 10 | Product (with residual moisture) |
| 11 | Drying (optional) |
| 12 | Hot gas |
| 13 | Offgas |
| 14 | Product (possibly dried) |
| 15 | Compacting (optional) |
| 16 | Product (possibly compactate) |
| 17 | Compounding (e.g. pelletization or extrusion) |
| 18 | Additives |
| 19 | End product |
| 200 | Water |

Figure 2:
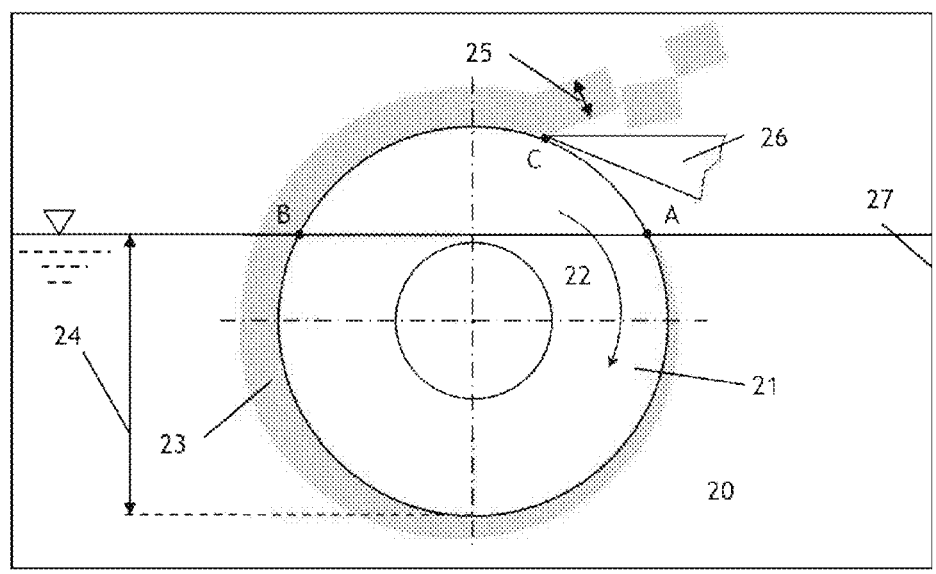
FIG. 2 shows a roll-type icemaking machine/a roll-type chiller.

FIG. 2 Reference Sign List

| | |
|---|---|
| 20 | Dispersion |
| 21 | Roll |
| 22 | Direction of rotation |
| 23 | Ice |
| 24 | Immersion depth of roll $h_{dip}$ |
| 25 | Thickness of ice layer $h_{ice}$ |
| 26 | Blade (variable position) |
| 27 | Container (trough) |
| A | Start of immersed roll circumference |
| B | End of immersed roll circumference |
| C | Position of blade |

Figure 3:
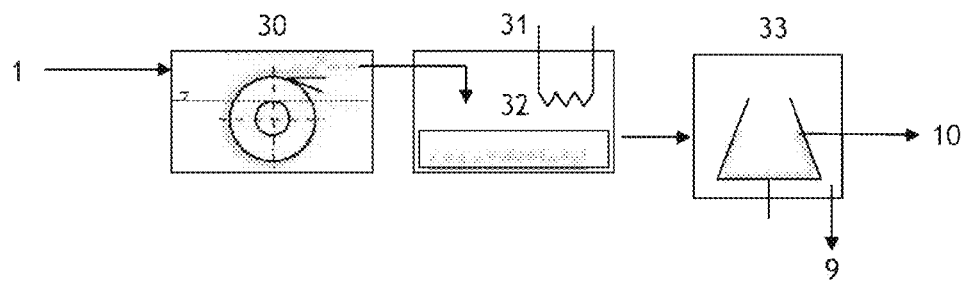
FIG. 3 shows a process involving a roll-type icemaking machine, discontinuous container sintering in a drying cabinet and a centrifuge.

FIG. 3 Reference Sign List

| | |
|---|---|
| 1 | Dispersion |
| 9 | Wastewater (with solids fraction) |
| 10 | Product (with residual moisture) |
| 30 | Roll-type icemaking machine |
| 31 | Drying cabinet |
| 32 | Container (sealed) |
| 33 | Centrifuge |

Figure 4:
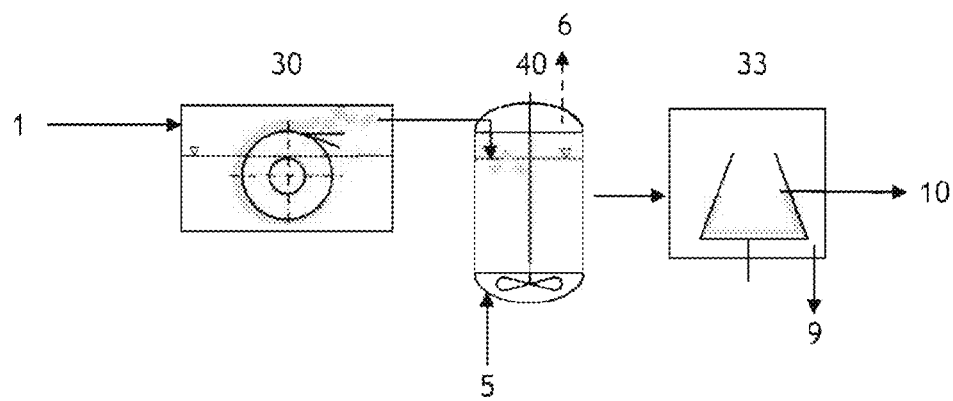
FIG. 4 shows an inventive process featuring a roll-type icemaking machine, continuous/discontinuous sintering in a stirred tank and a centrifuge.

FIG. 4 Reference Sign List

| | |
|---|---|
| 1 | Dispersion |
| 5 | Water and/or water vapor |
| 6 | Offgas |
| 9 | Wastewater (with solids fraction) |
| 10 | Product (with residual moisture) |
| 30 | Roll-type icemaking machine |
| 33 | Centrifuge |
| 40 | Stirred tank |

Figure 5:
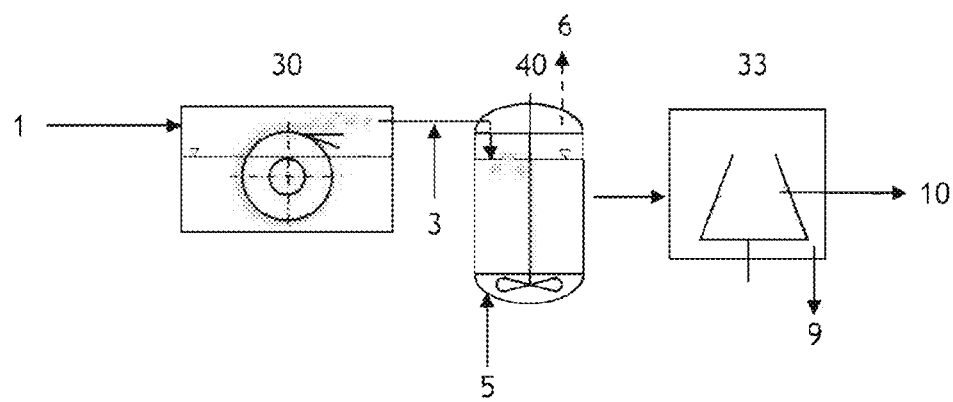
FIG. 5 shows an inventive process featuring a roll-type icemaking machine, continuous/discontinuous sintering in a stirred tank and a centrifuge.

FIG. 5 Reference Sign List

| | |
|---|---|
| 1 | Dispersion |
| 3 | Water and/or water vapor |
| 5 | Water and/or water vapor |
| 6 | Offgas |
| 9 | Wastewater (with solids fraction) |
| 10 | Product (with residual moisture) |
| 30 | Roll-type icemaking machine |
| 33 | Centrifuge |
| 40 | Stirred tank |

DETAILED DESCRIPTION OF THE INVENTION

The present invention provides a continuous or semi-continuous freeze coagulation process for aqueous polymer dispersions which comprises a freezing step and a solid-liquid separation step and is further characterized in that this process comprises the further step of:

admixing water and/or water vapor between the freezing step and the solid-liquid separation step, wherein the solid-liquid separation step is defined by a separation factor P as per the formula $$P = \frac{m_{H2O,mech}}{m_{H2O,tot}}$$

where $m_{H2O,mech}$ represents the mechanically removed amount of water, i.e. the amount of aqueous phase removed, and $m_{H2O,tot}$ represents the total amount of water resulting from summing of the water i.e. the aqueous phase from the originally used aqueous polymer dispersion and the added water and/or water vapor, and wherein P is ≥0.55, preferably ≥0.8, more preferably ≥0.93, and even more preferably ≥0.95.

It transpired as particularly advantageous in this connection that, on producing test specimens from the product obtained by the above process, the ASTM 1003 (1997) haze of these test specimens was found to be <20%, preferably <15%, after hot water storage at 70° C., preferably at 80° C.

This process of the present invention provides control over certain product properties through certain processing parameters such as, for example, freezing rate, sintering temperature and proportion of removed water/aqueous phase.

Figure 1:
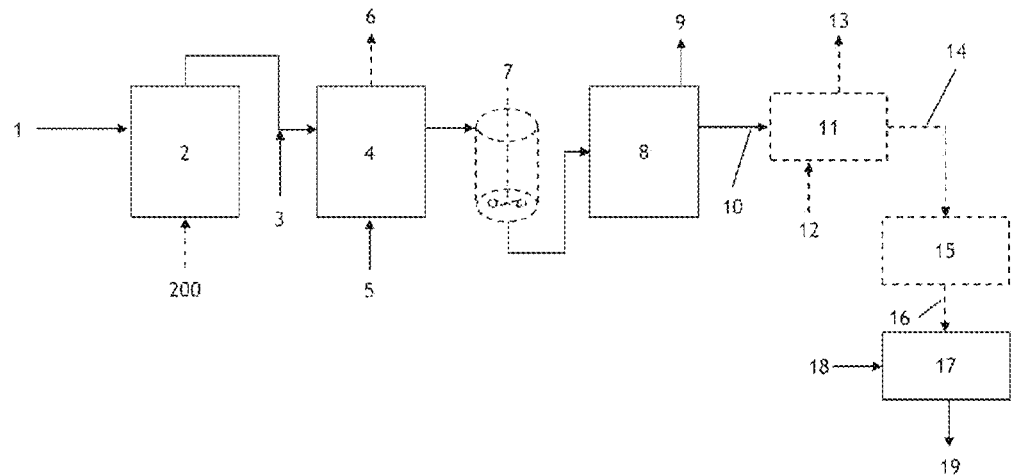
FIG. 1 shows a flow diagram of a process according to the present invention.

FIG. 1 schematically depicts an embodiment of a continuous or semi-continuous freeze coagulation process according to the present invention.

Freezing Step:

According to the present invention, the freezing step may take place in any technical appliance suitable for continuous or semi-continuous freezing of liquids or dispersions. It may also be possible to use self builds (e.g. tube bundles) in which the material is frozen.

Examples of commercially available appliances useful for continuous freezing and for the purposes of the present invention include flake ice generators, in particular roll-type icemaking machines or roll-type chillers (e.g. GEA Refrigeration Technologies, Ziegra Eismaschinen GmbH, Scotsman Ice Systems, Icesta Ice Systems, Higel Kältetechnik e. K., Maja-Maschinenfabrik, Funk GmbH, Gouda, DVA)

generators for crushed ice, nugget ice or StreamIce® (e.g. Scotsman Ice Systems, Ziegra Eismaschinen GmbH)

screw-type heat exchangers (e.g. AMF, Celsius)
scraped heat exchangers (e.g. HRS, Waukesha, AxFlow, OMVE)
strip ice generators (e.g. SAMFI)
extruder technologies (e.g. Entex).

The continuous freezing step of the present invention is preferably carried out in a flake ice generator or in a heat exchanger. In a further preferred embodiment, the process of the present invention is characterized in that the freezing step is effected on a cooled, rotating roll, preferably on a roll-type icemaking machine. In a particularly preferred form of this embodiment, the cooled, rotating roll, preferably the roll-type icemaking machine, dips into the aqueous polymer dispersion to be frozen.

Examples of commercially available appliances useful for semi-continuous freezing and for the purposes of the present invention include
tube or tubular ice generators (e.g. Icesta Ice Systems, Vogt Ice, Sulzer Kristaller)
plate icemaking machines (e.g. HTT-Buco, Vogt Ice)
block ice generators (e.g. Icesta Ice Systems, Ziegra Eismaschinen GmbH).

A semi-continuous freezing strip preferably utilizes tube ice generators and block ice generators.

In tube ice generators, water is frozen in upright tubes. The tube wall is subsequently warmed, causing the frozen bars of ice to slide out before they are cut into short pieces by blade. These kinds of apparatus are typically designed such that an unfrozen core is left in the centre of the ice bar in order to minimize the stress imposed by the expanding water as it freezes.

The freezing rate G is determined in the present invention by $$G = \frac{h_{ice}}{t_{freeze}} \quad (1)$$

Where $h_{ice}$ represents the thickness of the ice layer formed within the time $t_{freeze}$.

In one preferred embodiment of the process according to the present invention, the freezing step is effected at a freezing rate G as per Equation (1), where G
is in the range of 1-100 cm/h,
preferably in the range of 2-70 cm/h,
more preferably in the range of 4-65 cm/h,
yet more preferably in the range of 5-60 cm/h.
yet still more preferably in the range of 6-55 cm/h,
yet still even more preferably in the range of 7-35 cm/h,
yet even further preferably in the range of 8-25 cm/h, and
most preferably in the range of 9-15 cm/h.

Determination of Freezing Rate when a Roll-Type Icemaking Machine is used:

FIG. 2 exemplifies the use in a process according to the present invention by depicting a roll-type icemaking machine wherein the provided dispersion, i.e. the aqueous polymer dispersion, is frozen continuously in a layer on a cooled rotating roll.

The roll of radius $r_W$ and width $b_W$ rotates at the speed setting $n_W$ in the provided dispersion of temperature $T_D$. Roll temperature $T_W$, speed $n_W$ and roll immersion depth $h_{dip}$ can be varied here. It is assumed for the purposes of the present invention that the roll temperature $T_W$ is equal to the temperature of the evaporator of the icemaking machine.

The freeze operation starts after the rotating roll surface of a roll temperature $T_W$ dips into the provided dispersion. The contact time of the roll with the dispersion $t_{dip}$ (=immersion time) is equal to the time needed to travel the arc A-B (cf. FIG. 2). This time depends on the speed $m_W$ and the degree of immersion of the roll. This degree of immersion is defined as the ratio of the immersed surface area to the total surface area of the roll. In the preferred case of a cylindrical roll, it corresponds to the ratio of the immersed circumference $U_{dip}$ (=length of arc A-B in FIG. 2) to the whole circumference $U_W$ of the roll. The ice layer formed emerges from the provided dispersion and travels the distance B-C (cf. FIG. 2) before it is scrapped off by a blade and exported.

The invention likewise comprises embodiments wherein alternatively two or more rotations of the roll with ice formation are possible before the ice layer is removed. These embodiments may be formed for example by providing a variable separation between the blade and the surface of the roll.

The dispersion reservoir may be filled in a continuous or semi-continuous (batchwise) manner.

In one preferred embodiment of the process according to the present invention, the dispersion reservoir is filled in a continuous manner such that the roll's depth or degree of immersion $h_{dip}$ during the freezing operation remains constant or substantially constant.

The freezing rate in the context of the invention is determined on the approximating assumption that the actually formed ice layer $h_{ice}$ (see hereinbelow) is only formed on the immersed part of the roll (arc A-B in FIG. 2) during the time of immersion $t_{dip}$. However, the ice layer thickness $h_{ice}$ to be used also encompasses any proportion formed as a result of the aqueous film which wets the ice layer after re-emergence also becoming frozen through. It is thus assumed that the entire ice layer $h_{ice}$ is only formed on the immersed portion of the roll during the time of immersion $t_{dip}$.

"Frozen" in the context of the present invention is to be understood as meaning that the dispersion, i.e. the aqueous polymer dispersion, is in a solid physical state. The advantage of a high proportion of frozen aqueous polymer dispersion after the freezing step is that a very small polymer proportion in the wastewater is obtainable in this way.

Accordingly, a process which is carried out in accordance with the present invention by using a roll-type icemaking machine as per or in line with FIG. 2 and the above description will have $$G^* = \frac{h_{ice}}{t_{dip}} \quad (2)$$

and hence $G^* \approx G$.

The immersion time $t_{dip}$ is defined as follows:

$$t_{dip} = \frac{1}{n_W} \cdot \text{degree of immersion} = \frac{1}{n_W} \cdot \frac{U_{dip}}{U_W} \quad (3)$$

$h_{ice}$, if it cannot be determined experimentally, can be determined using the mass flows $\dot{m}_{ice} = \dot{m}_{disp}$ and the following relationships: Given a constant amount of provided dispersion in the container over time, the dispersion mass flow $\dot{m}_{disp}$ provided to the container is equal to the dispersion ice mass flow $\dot{m}_{ice}$ removed from the container, i.e. $\dot{m}_{ice} = \dot{m}_{disp}$. For a known mass flow $\dot{m}_{disp}$, a known roll speed $n_W$ and known geometric characteristics for the roll, the computation of $h_{ice}$ is done as follows:

The ice volume $V_{ice}$ formed per revolution is given by $$V_{ice} = \frac{\dot{m}_{ice}}{\rho_{ice} n_W} \quad (4)$$

where a numerical value of the $\rho_{ice}=1015$ kg/m³ s assumed for the density of the frozen dispersion for the present invention.

Further:

$$V_{ice} = \pi (r_W + h_{ice})^2 \cdot b_W - \pi r_W^2 \cdot b_W = \pi b_W (2 r_W h_{ice} + h_{ice}^2) \quad (5)$$

This results in the following relationship between the ice layer thickness $h_{Eis}$, the roll geometry, the speed $n_W$ and the output $\dot{m}_{Eis}$:

$$h_{ice}^2 + 2 r_W h_{ice} - \frac{\dot{m}_{ice}}{\pi \rho_{ice} n_W b_W} = 0 \quad (6)$$

The ice layer thickness $h_{ice}$ is attained from the solution to this quadratic Equation (6) and combined with the immersion time $t_{dip}$ (Equation (3)) to obtain the freezing rate G* (Equation (2)) for a process which is in accordance with the present invention and employs a roll-type icemaking machine as per FIG. 2.

One preferred embodiment of the process according to the present invention is characterized in that 90% by weight
preferably 95% by weight and
more preferably 100% by weight of the total weight of the aqueous polymer dispersion is in a frozen state after the freezing step.

The freezing step leads to a coarsening of the dispersion particles (with the formation of a so-called coagulum) which results in an improved removal of the liquid water/aqueous phase, i.e. a solid-liquid separation, and/or makes this separation step industrially sensible in the first place.

Water and/or Water Vapor Admixture:

The step of mixing water and/or water vapor between the freezing step and the solid-liquid separation step is a mandatory element of the process according to the present invention.

This step of mixing water and/or water vapor in the present invention is preferably effected by admixing water as the frozen aqueous polymer dispersion is being transferred into a device for the thawing and optionally sintering steps (see hereinbelow; cf. also reference sign (3) in FIGS. 4 and 5). This process water as it is also called facilitates in particular the transfer of the stock, i.e. of the frozen polymer dispersion. The transfer is facilitated particularly when 100% by weight of the total weight of the aqueous polymer dispersion is in a frozen state after the freezing step.

The step of admixing water and/or water vapor in the present invention is effected with particular preference by admixing water and/or water vapor directly into the device for the thawing and optionally sintering steps (see hereinbelow; cf. also reference sign (5) in FIG. 5).

What is particularly preferable for the purposes of the present invention is not only an admixture of water in the course of the transfer of the frozen aqueous polymer dispersion into a device for the thawing and optionally sintering steps but also an admixture of water and/or water vapor directly into the device for the thawing and optionally sintering steps.

A step of admixing water and/or water vapor may be effected before, during or after any thawing and optionally sintering steps, although it always takes place before the solid-liquid separation step.

A process which is in accordance with the present invention gives the option, which is preferably exercised in combination with one of the above-described preferred embodiments, of admixing water also additionally in the dispersion reservoir, for example by spraying the roll of the roll-type icemaking machine or roll-type chiller if used (reference sign 200 in FIG. 1 refers to this operation).

The weight-specific solid fraction (=polymer) of the aqueous polymer dispersion post water and/or water vapor admixture (=$w_{polymer, out}$) is below the weight-specific solid fraction (=polymer) of the frozen aqueous polymer dispersion pre water and/or water vapor admixture (=$w_{polymer}$), being in the range of 99.5%-10%,
preferably in the range of 75%-25%,
more preferably in the range of 70%-30%,
most preferably in the range of 65%-35%.

of the weight-specific solid fraction (=polymer) of the aqueous polymer dispersion pre water and/or water vapor admixture. By "weight-specific solid fraction" of the aqueous polymer dispersion is meant the weight fraction of polymer in the aqueous polymer dispersion.

Consider, for example, 1000 g of aqueous polymer dispersion having a (weight-specific) solid fraction (=polymer) of originally 41% by weight, i.e. having 410 g of polymer in 1000 g of dispersion: this dispersion has sufficient water added to it that the weight-specific solid fraction (=polymer) of the aqueous polymer dispersion is subsequently 20.5 wt % (this corresponds to 50% of the originally provided weight-specific solid fraction of 41% by weight). In order to achieve the reduction from 41% by weight to 20.5% by weight in the weight-specific solid fraction (=polymer) of the aqueous polymer dispersion, the present example requires a water and/or a water vapor admixture of 1000 g to the originally present 1000 g of aqueous polymer dispersion (the 410 g of polymer are thus present in 2000 g of dispersion, i.e. the weight-specific solid fraction (=polymer) of the aqueous polymer dispersion produced is 20.5% by weight).

The present invention provides that an admixture of water and/or a water vapor may further take place at various further points in the process according to the present invention, in the form of water and/or water vapor (e.g. as heat transfer medium, as process water).

Thawing Step and Optional Sintering Step:

In a further preferred embodiment of the process according to the present invention, the latter further comprises a thawing step and optionally a further sintering step.

"Thawing step" in the context of the present invention refers to an operation wherein the at least partly frozen aqueous polymer dispersion is brought from the solid state into the liquid state.

"Sintering step" in the context of the present invention refers to the operation which takes place at a sintering temperature T (temperature at which a stabilizing step takes place), wherein the sintering temperature T is in the range of $T \geq T^G - 50$ K,
preferably in the range of $T \geq T^G - 30$ K,
more preferably in the range of $T^G - 15$ K $\leq T \leq T^G + 5$ K.

$T_G$ in these range particulars represents the glass transition temperature of the outer shell/layer of the dispersed polymeric material, i.e. of the aqueous polymer dispersion.

An additional sintering step is optional in a process which is in accordance with the present invention. An additional sintering step may be obviated when any sintering takes place automatically due to the freezing step and the subsequent thawing step. As a result of sintering the aqueous polymer dispersion is present in the form of a liquid phase wherein the particles of the polymer dispersion have filmed. Sintering for the purposes of the present invention is also to be understood as meaning stabilizing by post-heating.

Stabilizing the agglomerates produced by freeze coagulation is the primary purpose of sintering, an increase in particle size may possibly also be achieved here.

The thawing and/or the optional sintering step is performable in any technical appliance suitable for thawing and sintering frozen material, liquids or dispersions.

Examples of useful commercially available appliances include
- tanks or reactors (stirred, unstirred, continuous, semicontinuous, batch) with/without steam injection—the ice here enters a temperature-regulated aqueous solution,
- standing pipes (with/without temperature regulation),
- heat exchangers (e.g. plate, tube-bundle or screw-type heat exchangers),
- drying and/or conditioning cabinets/spaces, and
- heatable conveyor belts or vibratory chutes or other types of conveying apparatus for bulk goods or sludges (e.g. screw conveyors).

In one preferred embodiment of the process according to the present invention, the process comprises both a thawing and a sintering step, both steps being carried out in one device. It is further particularly preferable in this preferred embodiment for the device for the thawing and sintering steps to be operated in a continuous manner.

It is further preferable in the present invention for at least the or a further admixture of water and/or water vapor to take place during the thawing and/or sintering step. It is further preferable for the water and/or water vapor admixture during a thawing and/or sintering step to take place in a tank or reactor by steam injection.

After thawing with or without sintering, the particles of the aqueous polymer dispersion are in the form of a coagulum.

Solid-Liquid Separation Step:

The solid-liquid separation step is carried out by separating the thawed/sintering coagulum into a solid fraction (with residual moisture) and liquid fraction (with solid fraction) mechanically (e.g. by centrifugation) and optionally also thermally (e.g. by drying).

Removing the solid fraction from the coagulum may be effected in any technical appliance which is suitable for this purpose.

Examples of commercially available appliances useful for the purposes of the present invention include
- centrifuges (e.g. horizontal or vertical peeler centrifuges, pusher centrifuges, screen bowl centrifuges, etc.),
- decanters,
- centrifugal dryers or other
- drying concepts where mechanical liquid removal of water and of the aqueous phase takes place,
- heat exchanger concepts, and
- squeeze-off ranges.

The solid-liquid separation step in a process according to the present invention preferably takes place in a centrifuge.

The separation step is defined by introducing the separation factor P the ratio of the mechanically removed amount of water/aqueous phase $m_{H2O,mech}$ to the entire amount of water (=sum total of water/aqueous phase from the originally used aqueous polymer dispersion plus the added water and/or water vapor) $m_{H2O,tot}$:

$$P = \frac{m_{H2O,mech}}{m_{H2O,tot}} \qquad (7)$$

The process according to the present invention, preferably according to at least one of the preceding preferred embodiments, is characterized in that the solid-liquid separation step is defined by a separation factor P as per the Equation (7), where $m_{(H2O,mech)}$ represents the mechanically removed amount of water or the amount of aqueous phase removed and $m_{(H2O,tot)}$ represents the total amount of water resulting from summing of the water/aqueous phase from the originally used aqueous polymer dispersion and the added water and/or water vapor, and wherein P is ≥0.55, preferably ≥0.8, more preferably ≥0.93 and even more preferably ≥0.95.

Compounding Step:

After passing through the solid-liquid separation step, the removed solid fraction (with residual moisture; = the residually moist material M) may, in a preferred embodiment, be further processed directly under the optional admixture of further additives, in a compounding step, for example to perform an extrudate and/or a pellet material.

The compounding step may be effected in any technical appliance suitable for this purpose.

Examples of commercially available appliances useful for the present invention include
- extruders (planetary roll extruders, single-screw extruders, twin-screw extruders, co- or counterrotary),
- static mixers,
- kneaders or
- roll mills,
- optionally with subsequent pelletization, die-face/hot-cut or cold-cut.

In one preferred embodiment of the process according to the present invention, the solid-liquid separation step is followed by a compounding step, preferably in a 2-screw extruder with subsequent pelletization.

In another further preferred embodiment of the process according to the present invention, the solid-liquid separation step is followed by a compounding step via an extrusion step to produce sheet or film.

The further additives which may be admixed in a process of the present invention, for example in an extrusion step and/or a pelletization step, are preferably selected from the group consisting of (co)polymers based on (meth)acrylate, in particular PMMA molding compositions in pellet form; UV stabilizer packages; lubricants; dyes, preferably dyes for transparent coloration; processing aids; antioxidants and stabilizers.

It is particularly preferable to admix a UV stabilizer package. This stabilizer package is preferably made of UV absorbers and UV stabilizers. The UV stabilizers in question are generally sterically hindered amine light stabilizers (HALS compounds). The UV absorbers in question may be benzophenones, salicylic esters, esters, oxalanilides, benzoxazinones, hydroxyphenylbenztriazoles, triazines, benztriazoles or benzylidene malonates. UV absorbers may alternatively also have been polymerized into the matrix material by a polymerization-active group.

Drying Step and/or Compacting Step (Optional):

In one specific embodiment of the process according to the present invention, the removed solid fraction (with residual moisture) passes from the solid-liquid separation step not to the direct compounding step but alternatively to an additional drying step and/or an additional compacting step.

The alternative drying step may be used to further reduce the residual moisture content of the removed solid fraction. The compacting step, which is likewise alternative to the direct compounding step, may be included after the solid-liquid separation step for the purpose of additional shaping. The preference of the present invention over direct compounding is further for the combination of a) a drying step to further reduce the residual moisture content, and b) a compacting step for additional shaping after this drying step.

The steps of drying and compacting may be carried out in any appliance suitable for this purpose.

Examples of commercially available appliances useful for drying include (vacuum) contact dryers (of the paddle, disc, coil or pan type), convection dryers (of the moving bed or pneumatic type), and spiral vibrating conveyors.

Examples of commercially available appliances useful for compacting include tableting machines, annular die presses, and roll compactors.

The step of a compacting operation in an extended sense also comprehends a fluidized bed granulation, and melting the removed solid fraction (with residual moisture) in an extruder and subsequent pelletization.

The scope of the present invention comprehends one preferred embodiment of the process according to the present invention wherein a drying step and/or a compacting step are carried out between the solid-liquid separation step and a compounding step.

A very particularly preferred embodiment of the process according to the present invention is characterized in that the process comprises the following successive steps:

a freezing step at a freezing rate G in the range of 1-100 cm/h, an admixture of water and/or water vapor after the freezing step and before the solid-liquid separation step, a thawing step by warming with steam and optionally a sintering step at a sintering temperature T, where $T \geq T^G - 50$ K, a solid-liquid separation step in a centrifuge, wherein the solid-liquid separation step is defined by a separation factor P as per the formula $$P = \frac{m_{H2O,mech}}{m_{H2O,tot}}$$

where $m_{H2O,mech}$ represents the mechanically removed amount of water, i.e. the amount of aqueous phase removed, and $m_{H2O,tot}$ represents the total amount of water resulting from summing the water i.e. the aqueous phase from the originally used aqueous polymer dispersion and the added water and/or water vapor, and wherein P is $\geq 0.8$, optionally a drying step and/or a compacting step, a pelletization or extrusion step under admixture of further additives, in particular copolymers based on (meth)acrylate. UV absorbers and/or lubricant(s).

A further very particularly preferred embodiment of the process according to the present invention is characterized in that the process comprises the following successive steps:

a freezing step at a freezing rate G in the range of 9-55 cm/h, an admixture of water and/or water vapor after the freezing step and before the solid-liquid separation step, a thawing step by warming with steam and optionally a sintering step at a sintering temperature T, where $T^G - 15$ K $\leq T \leq T^G + 5$ K, a solid-liquid separation step in a centrifuge, wherein the solid-liquid separation step is defined by a separation factor P as per the formula $$P = \frac{m_{H2O,mech}}{m_{H2O,tot}}$$

where $m_{H2O,mech}$ represents the mechanically removed amount of water, i.e. the amount of aqueous phase removed, and $m_{H2O,tot}$ represents the total amount of water resulting from summing the water i.e. the aqueous phase from the originally used aqueous polymer dispersion and the added water and/or water vapor, and wherein P is $\geq 0.95$, a drying step and/or a compacting step, a pelletization or extrusion step under admixture of further additives, in particular copolymers based on (meth)acrylate, UV absorbers and/or lubricant(s), wherein the freezing step is effected via a roll-type icemaking machine.

The product obtained from the process is the removed solid fraction (with residual moisture) with or without further working-up by a compounding step and optionally further drying step and/or compacting step.

Product Characteristic:

One characteristic of the product obtained from the process is the residual moisture content $w_{H2O}$ of the product at the end of the operation (i.e. after the solid-liquid separation step and optionally further drying step and/or optional further compacting step).

$$w_{H2O} = \frac{m_{H2O}}{m_{polymer} + m_{H2O}} \quad (8)$$

where $m_{H2O}$ represents the mass of the water in the product and $m_{polymer}$ represents the mass of the polymer in the product.

Aqueous Polymer Dispersion:

Any desired aqueous polymer dispersion can be used for the process of the present invention. In the context of the present invention the term "an aqueous polymer dispersion" also comprehends a mixture of two or more aqueous polymer dispersions.

One preferred embodiment of the process according to the present invention, preferably according to at least one of the preceding preferred embodiments, concerns an aqueous polymer dispersion which is (meth)acrylate based, preferably polymethacrylate based, more preferably PMMA (polymethylmethacrylate) based. The term (meth)acrylate comprehends acrylate and methacrylate as well as mixtures thereof.

Aqueous polymer dispersions containing one, two or more impact modifiers are preferably used for the purposes of the present invention. Impact modifiers are polymer particles which, for example, are prepared by bead polymerization or by emulsion polymerization and are in the form of an aqueous polymer dispersion at the end of the synthesizing step. This aqueous polymer dispersion contains not only the polymer fraction but also polar, water-soluble auxiliary materials (emulsifiers, initiators and other redox components, etc.) that are needed to carry out the polymerization step.

Impact modifiers consist in general of at least 40%, preferably 50-70%, by weight of methylmethacrylate, 20% to 45%, preferably 25% to 42% by weight of butyl acrylate and also 0.1% to 2%, preferably 0.5% to 1% by weight of a crosslinking monomer, for example a polyfunctional (meth)acrylate such as, for example, allyl methacrylate and optionally further monomers such as, for example, 0% to 10%, preferably 0.5% to 5% by weight of C1-C4 alkyl methacrylates, such as ethyl acrylate or butyl methacrylate, preferably methylacrylate, or other vinylically polymerizable monomers such as, for example, styrene.

Preferred impact-modifying agents are chain growth addition polymer particles with a two- or three-layered core-shell construction which are obtainable by emulsion polymerization (see for instance EP-A 0 113 924, EP-A 0 522 351, EP-A 0 465 049 and EP-A 0 683 028). Particle sizes for these emulsion polymers are typically in the range of 100-500 nm, preferably 200-400 nm.

Further-preferred impact modifiers include two phase impact modifiers as described in EP 0 528 196 A1, which are used for film production in particular, but are not restricted thereto. EP 0 528 196 A1 uses a two-phase impact-modified chain growth addition polymer formed from:
  a1) 10% by weight to 95% by weight of a coherent hard phase having a glass transition temperature $T_{mg}$ above 70° C., constructed of
    a11) 80% by weight to 100% by weight (based on a1) of methyl methacrylate, and
    a12) 0% by weight to 20% by weight of one or more further ethylenically unsaturated free-radically polymerizable monomers, and
  a2) 90% by weight to 5% by weight of a toughening phase with a glass transition temperature $T_{mg}$ below −10° C. which is distributed in the hard phase and constructed of
    a21) 50% by weight to 99.5% by weight of a $C_1$-$C_{10}$ alkyl acrylate (based on a2),
    a22) 0.5% by weight to 5% by weight of a crosslinking monomer having two or more ethylenically unsaturated free-radically polymerizable moieties, and
    a23) optionally further ethylenically unsaturated free-radically polymerizable monomers, wherein at least 15% by weight of hard phase a1) is covalently linked to toughening phase a2).

These two-phase impact-modifying agents are obtainable via a two-step emulsion polymerization in water as described in DE-A 38 42 796 for example. The first step comprises producing toughening phase a2) constructed of at least 50% by weight, preferably more than 80% by weight, of lower alkyl acrylates, resulting in a glass transition temperature $T_{mg}$ for this phase of below −10° C. As crosslinking monomers a22) are used (meth)acrylic esters of diols, for example ethylene glycol methacrylate or 1,4-butanediol dimethacrylate, aromatic compounds having two vinyl or allyl groups, for example divinylbenzene, or other crosslinkers having two ethylenically unsaturated free-radically polymerizable moieties, for example allyl methacrylate as graft crosslinker. As crosslinkers having three or more unsaturated free-radically polymerizable groups, such as allyl groups or (meth)acryloyl groups, there may be mentioned for example triallyl cyanurate, trimethylolpropane triacrylate, trimethylolpropane trimethacrylate, pentaerythritol tetraacrylate and pentaerythritol tetramethacrylate. U.S. Pat. No. 4,513,118 gives further examples in this regard.

Examples of impact modifiers that are preferred for the purposes of the present invention are likewise for instance
  2-phase impact modifiers based on butyl acrylate, as disclosed for instance in DE 10 2005 062 687 A1, and
  3-phase impact modifiers based on butyl acrylate, as disclosed for instance in EP 1 332 166 B1.

The present invention further provides a process for producing a semi-finished transparent product, characterized in that a process according to at least one of the above-described embodiments is utilized. The semi-finished products preferably comprise sheet or film, in particular weather-protection film.

The meaning of "transparent" in the context of the present invention is that there is at least 85% transmission through a thickness of 3 mm. It is further preferable for the semi-finished transparent products to have an ASTM 1003 (1997) haze of <20%, preferably <15%, after hot water storage at 70° C., preferably 80° C., when 3 mm thick, The present invention further provides for the use of the step of
  admixing water and/or water vapor,
  in a continuous or semi-continuous freeze coagulation process for an aqueous polymer dispersion comprising a freezing step and a solid-liquid separation step, wherein the step of admixing water and/or water vapor is effected between the freezing step and the solid-liquid separation step, to improve the optical quality of the process product, in particular to improve the haze values.

The present invention further provides a powder obtained according to the process of the present invention, preferably according to a preferred process of the present invention. The present invention further provides a molding composition comprising the powder of the present invention. The present invention likewise provides a molded article containing or consisting of a molding composition according to the present invention, the molded article preferably being transparent. The molded article of the present invention is preferably a semi-finished product, preferably a transparent semi-finished product, made using process product from the process according to the present invention, having an ASTM 1003 (1997) haze of <20%, preferably <15%, after hot water storage at 70° C., preferably after hot water storage at 80° C.

The examples which follow serve to provide more particular elucidation and better understanding of the present invention, but do not limit it or its scope in any way.

EXAMPLES

The aqueous polymer dispersions from the examples (dispersions 1-3) were prepared as follows: A polymerization vessel equipped with a stirrer, external cooling and a feed vessel was initially charged with 60 parts by weight of an aqueous phase containing 1% by weight of sodium laurylsulfate, 0.15% by weight of sodium hydroxymethylsulfate, 0.02% by weight of acetic acid and 0.008% by weight of iron (II) sulfate. An emulsion I was added at a temperature of 55° C. in an amount of 50 parts by weight by metered addition in the course of 2 hours under agitation. This was followed by the metered addition during a further 2 hours of 100 parts by weight of emulsion II. On completion of the addition the dispersion was cooled down to 20° C. and filtered through VA steel having a ~100 µm mesh size. The emulsions used as emulsions I and II were each obtained as 60% strength emulsion by emulsifying the hereinbelow indicated proportional parts by weight of the following constituents:

| | Dispersion 1 | Dispersion 2 | Dispersion 3 |
|---|---|---|---|
| 60% Emulsion I | | | |
| Butyl acrylate | 98 | 98 | 99 |
| Allyl methacrylate | 2.0 | 2.0 | 1 |
| tert-Butyl hydroperoxide (70% alcoholic-aqueous solution) | 0.1 | 0.1 | 0.1 |
| Sodium laurylsulfate (0.15% aqueous solution) | 67 | 67 | 67 |
| 60% Emulsion II | | | |
| Methyl methacrylate | 92 | 88 | 98.5 |
| Butyl acrylate | 8.0 | 12 | — |
| Ethyl acrylate | — | — | 1.5 |
| Dodecyl mercaptan | 1.0 | 1.0 | 0.5 |
| tert-Butyl hydroperoxide (70% alcoholic-aqueous solution) | 0.1 | 0.1 | 0.1 |
| Sodium laurylsulfate (0.15% aqueous solution) | 100 | 100 | 100 |

The aqueous polymer dispersions obtained were adjusted to a polymer concentration $w_{polmer, ex}$ of 41% by weight (dispersions 1 and 2) and 40% by weight (dispersion 3).

Characteristic parameters determined in the present examples were the separation factor P (Equation (7)) and the freezing rate G* (Equation (2)) for the process and the residual moisture content $w_{H2O}$ (Equation (8)) for the product of said process.

To determine haze values within the meaning of the present invention and particularly for the adduced examples, the process product was in each case compounded as follows: the particular process product was introduced into the hopper of a Stork single-screw extruder having a screw diameter of 35 mm. The melt temperature was 235° C. The extrudates emerging from the extruder die, were cooled in a water bath and evenly pelletized. After compounding, the pellet material obtained was injection molded at 250° C. on a Battenfeld BA injection molding machine into 65 mm×40 mm×3 mm test specimens in accordance with ISO 294. These test specimens were tested with a BYK Gardner Hazegard-plus haze meter at 23° C. in accordance with the ASTM D 1003 (1997) method of measurement, not only in the original state ("Haze before") but also after hot water storage. To determine the haze values after hot water storage at 70° C. ("Haze 70° C.") and 80° C. ("Haze 80° C."), the test specimens were stored in temperature-regulated distilled water at 70° C. and 80° C., respectively, for 24 h while being completely covered with water at all times.

1.1. Comparative Example 1

Dispersion 1 was worked up with the process depicted in FIG. 3 by continuous freeze coagulation with an HEC 400 roll-type icemaking machine from HIGEL (schematically depicted in FIG. 2) having a roll radius $r_W$=0.09 m and a roll width $b_W$=0.19 m, including thawing/sintering (batch) and centrifugation.

This was done by varying the roll speed $n_W$, the roll temperature $T_W$ and the immersion depth $h_{dip}$ and determining the mass flow of the frozen dispersion $\dot{m}_{disp}$ in each case. The freezing rate G* was computed by Equations (2)-(6).

After the freezing step, the dispersion was subsequently thawed and sintered in a container in a drying cabinet at an average temperature of $T_{TS}$=80° C.-100° C. in the course of a residence time of $T_{TS}$=24 h and subsequently centrifuged.

The centrifuge used was a 776 SEK 203 spin dryer from Thomas, 57290 Neunkirchen, having a drum of internal diameter $d_{i,Z}$=0.24 m, height $h_Z$=0.32 m, polypropylene filter towel with mesh size=90 µm, max. load=4.5 kg and a (max.) spin speed $n_Z$=2800/min (particulars as quoted by the manufacturer). The dispersion was centrifuged for a spin time of $T_Z$=5 min. The amount used was $m_Z$=3 kg (max.).

After centrifugation, the residual moisture content $w_{H2O}$ of the removed solid fraction (=residually moist material M) was determined.

Results and operational parameters are summarized in Table 1.

TABLE 1

Operational parameters and experimental results of Comparative Example 1

| No. | $n_W$ 1/min | $h_{dip}$ mm | $T_W$ ° C. | $\dot{m}_{disp}$ kg/h | $w_{H2O}$ (of M) kg/kg | G* cm/h |
|---|---|---|---|---|---|---|
| 1.1 | 4 | 60 | −23 | 20.0 | 20.0% | 54 |
| 1.2 | 4 | 110 | −23 | 25.4 | 16.9% | 45 |
| 1.3 | 1.8 | 60 | −28 | 14.9 | 18.7% | 40 |
| 1.4 | 4 | 130 | −24 | 25.1 | 17.8% | 39 |
| 1.5 | 1.8 | 110 | −26 | 17.6 | 17.1% | 31 |
| 1.6 | 1.8 | 110 | −29 | 17.4 | 16.4% | 30 |
| 1.7 | 1.8 | 110 | −24 | 17.4 | 16.0% | 30 |
| 1.8 | 1.8 | 110 | −29 | 17.4 | 15.2% | 30 |
| 1.9 | 1.8 | 130 | −28 | 18.9 | 14.9% | 29 |
| 1.10 | 1.25 | 110 | −24 | 15.1 | 14.9% | 26 |
| 1.11 | 1.25 | 110 | −22 | 15.1 | 12.9% | 26 |
| 1.12 | 1 | 130 | −21 | 17.1 | 11.8% | 26 |
| 1.13 | 1 | 130 | −30 | 15.2 | 11.5% | 23 |
| 1.14 | 0.65 | 130 | −29 | 14.3 | 9.7% | 22 |
| 1.15 | 0.65 | 130 | −27 | 13.6 | 11.6% | 21 |
| 1.16 | 0.65 | 130 | −28 | 13.8 | 10.9% | 21 |
| 1.17 | 0.65 | 130 | −28 | 13.8 | 10.7% | 21 |
| 1.18 | 0.65 | 130 | −32 | 13.9 | 10.4% | 21 |
| 1.19 | 0.65 | 130 | −29 | 13.8 | 9.2% | 21 |
| 1.20 | 0.65 | 130 | −21 | 12.4 | 11.7% | 19 |
| 1.21 | 0.65 | 130 | −28 | 12.5 | 10.0% | 19 |
| 1.22 | 0.71 | 135 | −18 | 9.9 | 10.5% | 15 |
| 1.23 | 0.71 | 135 | −8 | 6.0 | 6.3% | 9 |
| 1.24 | 0.55 | 135 | −8 | 5.3 | 5.4% | 8 |
| 1.25 | 0.55 | 120 | −7 | 4.1 | 5.3% | 7 |

Comparative Example 2

Dispersion 2 was worked up by the process described in Comparative Example 1. This was done by varying the roll speed $n_W$, the roll temperature $T_W$ and the immersion depth $h_{dip}$ and determining the mass flow of the frozen dispersion $\dot{m}_{disp}$ in each case. The freezing rate G* was computed by Equations (2)-(6).

A sample was additionally prepared at a very low freezing rate by freezing for 48 h in a 10 L PE wide-neck container having an internal diameter of 22 cm at −20° C. (discontinuous process) for further comparison (container freezing test 2.1).

The thawing and sintering for tests 2.2-2.6 were carried out as described in Comparative Example 1. The centrifugation was applied until there was no longer any filtrate stream to be observed (max. 10 min). The removed solid fraction (=residually moist material M) was dried at 50° in a drying cabinet until a residual moisture content of $w_{H2O}$=max. about 1% by weight was obtained.

Test specimens with a thickness of 3 mm were prepared from dried material (having a residual moisture content of $w_{H2O}$=max. about 1% by weight=$M_{dry}$) for tests 2.2-2.5 using the compounding and subsequent injection-molding operations described above. These test specimens were used to determine the haze values.

In one case (test 2.6) the dried material $M_{dry}$ was washed with water and after renewed, similar centrifugation and drying used to prepare test specimens on which haze was determined.

The results and operational parameters of Comparative Examples 2 are summarized in Table 2.

The results of the test reveal that haze values after hot water storage at 70 and 80° C. in the dried material $M_{dry}$ increase as the freezing rate increases. A wash following a first centrifugation and drying to a residual moisture content of $w_{H2O}$=max. about 1% by weight with subsequent second centrifugation and drying to a residual moisture content of $w_{H2O}$=max. about 1% by weight did not yield any further improvement in the haze values (cf. sample 2.5 and sample 2.6 (=sample like sample 2.5 except after additional washing step as described above) in Table 2).

TABLE 2

Operational parameters and experimental results of Comparative Example 2

| No. | $n_W$ 1/min | $h_{dip}$ mm | $T_W$ ° C. | $\dot{m}_{disp}$ kg/h | Haze before | Haze 70° C. | Haze 80° C. | G* cm/h |
|---|---|---|---|---|---|---|---|---|
| 2.1 | Container freezing | | | | 3% | 24% | 44% | |
| 2.2 | 0.55 | 135 | −9 | 7 | 2% | 59% | 75% | 11 |
| 2.3 | 0.55 | 135 | −20 | 11 | 2% | 52% | 66% | 16 |
| 2.4 | 2.5 | 135 | −19 | 21 | 2% | 70% | 82% | 31 |
| 2.5 | 2.5 | 60 | −19 | 17 | 2% | 74% | 91% | 45 |
| 2.6 | 2.5 | 60 | −19 | 17 | 2% | 78% | 90% | 45 |

Comparative Example 3

Dispersion 2 was worked up using the process described in Comparative Example 1 at a constant roll speed $n_W$, constant roll temperature $T_W$, constant immersion depth $h_{dip}$ and hence constant freezing rate G*. The mass flow of the frozen dispersion $\dot{m}_{disp}$ was determined and the freezing rate G* was computed by Equations (2)-(6).

The worked-up dispersion was thawed and sintered as described in Comparative Example 1.

In contradiction to the preceding experimental series (Comparative Examples 1 and 2) different proportions P of aqueous solution were removed in the centrifugation (centrifuge as per Comparative Examples 1 and 2). This was done by varying the spin time $\tau_{WS}$. The particular value was then determined for the residual moisture content $w_{H2O}$ of the particular removed solid fraction (=residually moist material M).

The residually moist material M was then dried at 50° C. in a drying cabinet to a residual moisture content of $w_{H2O}$=about 1% by weight. Test specimens with a thickness of 3 mm were prepared from dried material (having a residual moisture content of $w_{H2O}$=max. about 1% by weight=$M_{dry}$) for tests 3.1-3.3 using the compounding and subsequent injection-molding operations described above. These test specimens were used to determine the haze values.

Table 3 presents results of test 2.2 from Comparative Example 2, where a spin time of $T_{WS}$=5 min led to a calibration (estimated $w_{H2O}$=about 10% by weight), versus the results of tests 3.1-3.3, where variable centrifugation times and, in some instances, re-admixture of some filtrate were used to set higher, defined residual moisture contents—before drying to a residual moisture content of $w_{H2O}$=about 1% by weight in the drying cabinet. Test 3.3 was carried out without mechanical solid-liquid separation (i.e. without performing a centrifugation); instead the residual moisture content of $w_{H2O}$=about 1% by weight was solely obtained via drying.

The results show that, when the freezing rate is kept constant, a decreasing proportion of mechanically removed water/aqueous phase leads to increasing haze values after hot water storage at 70 and 80° C.

TABLE 3

Operational parameters and experimental results of Comparative Example 3 (versus the results of test 2.2)

| No. | $n_W$ 1/min | $h_{dip}$ mm | $T_W$ ° C. | $\dot{m}_{disp}$ kg/h | $w_{H2O}$ (of M) kg/kg | P kg/kg | Haze before | Haze 70° C. | Haze 80° C. | G* cm/h |
|---|---|---|---|---|---|---|---|---|---|---|
| 2.2 | 0.55 | 135 | −9 | 7 | 10% | 92% | 2% | 59% | 75% | 11 |
| 3.1 | 0.55 | 135 | −9 | 7 | 30% | 70% | 2% | 69% | 86% | 11 |
| 3.2 | 0.55 | 135 | −9 | 7 | 40% | 54% | 2% | 93% | 98% | 11 |
| 3.3 | 0.55 | 135 | −9 | 7 | 59% | 0% | 2% | 100% | 100% | 11 |

Inventive Example 4

Dispersion 2 was worked up with the process depicted in FIG. 4 by continuous freeze coagulation with an HEC 400 continuous roll-type icemaking machine from HIGEL (schematically depicted in FIG. 2) having a roll radius $r_W$=0.09 m and a roll width $b_W$=0.19 m, subsequent thawing/sintering in a selectively batch- or conti-operable stirred tank (CSTR/STR) at a temperature T (see Table 4) and subsequent centrifugation (centrifuge as per Comparative Examples 1-3).

The stirred tank used had a fillable volume of V=4 L to 16 L, equipped with a steam-dosing module. The stirrer used was an Inter-MIG from EKATO with a diameter $d_R=0.9\,d_i$, where $d_i$ represents the internal diameter of the stirred tank. The stirred tank was batch operated and a corresponding amount of liquid water was admixed each time, such that a dispersion was obtained having a polymer concentration $w_{polymer,\,ex}$ as per Table 4 (the original polymer concentration amounted to 41% by weight). The mass flow of the frozen dispersion $\dot{m}_{Disp}$ was determined and the freezing rate $G^*$ was computed by Equations (2)-(6).

Centrifugation was carried on until the filtrate stream was observed to cease (max. 10 min). The P-values obtained (as % age) are reported in Table 4.

The residually moist material M was centrifuged and then dried at 50° C. in a drying cabinet to a residual moisture content of $w_{H2O}$=about 1% by weight. Test specimens with a thickness of 3 mm were prepared from dried material (having a residual moisture content of $w_{H2O}$=max. about 1% by weight=$M_{dry}$) for tests 4.1 and 4.2 using the compounding and subsequent injection-molding operations described above. These test specimens were used to determine the haze values.

Additional results and operational parameters are summarized in Table 4.

Table 4 further presents the results of tests (Table 4, tests 4.1 and 4.2) where water was admixed in the stirred tank (between the freezing step and the solid-liquid separation step) versus the result of test 2.2 (from Comparative Example 2), where no water was admixed between the freezing step and the solid-liquid separation step. The admixture of water before the solid-liquid separation (centrifugation) results in improved haze following hot water storage. Comparable haze values can no longer be achieved even by means of a subsequent washing step (see tests 2.5 and 2.6 of Table 2).

Inventive Example 5

Dispersion 3 was worked up with the process depicted in FIG. 5 by continuous freeze coagulation with an HEC 400 continuous roll-type icemaking machine from HIGEL (schematically depicted in FIG. 2) having a roll radius $r_W$=0.09 m and a roll width $b_W$=0.19 m, subsequent thawing/sintering in a selectively batch- or conti-operable stirred tank (CSTR/STR) at a temperature T (see Table 5) and subsequent centrifugation (centrifuge as per Comparative Examples 1-3).

The stirred tank used had a fillable volume of V=4 L to 16 L, equipped with a steam-dosing module. The stirrer used was an Inter-MIG from EKATO with a diameter $d_R$=0.9 $d_i$, where $d_i$ represents the internal diameter of the stirred tank. The stirred tank was operated in a continuous manner. The factors which were varied were the amount of steam $\dot{m}_D$ (at temperature $T_D$ and pressure $p_D$) injected into the stirred tank and hence the average sintering temperature T which becomes established in the stirred tank; the mass flow of the water $\dot{m}_{H2O}$ injected to transfer the frozen stock into the stirred tank remained constant. The other operational parameters of roll speed $n_W$, roll temperature $T_W$, immersion depth $h_{dip}$, stirrer speed $n_R$ and stirred tank residence time $\tau$ also remained substantially constant. The mass flow of the frozen dispersion $\dot{m}_{disp}$ was determined and the freezing rate $G^*$ was computed by Equations (2)-(6).

Centrifugation was carried out as described in the Comparative Example 1. It was carried on until the filtrate stream was observed to cease (max. 10 min). The P-values obtained (as % age) are reported in Table 5.

The other results and operational parameters are summarized in Table 5. $\Delta T$ represents the difference between the sintering temperature T and the glass transition temperature $T^G$ of the outer shell/layer of the dispersed polymer material (here: 110° C.).

The results show that the residual moisture content $w_{H2O}$ achievable for the residually moist material M after centrifugation decreases with increasing sintering temperature.

TABLE 4

Operational parameters and experimental results of Inventive Example 4 (with Comparative Example 2.2)

| No. | $n_W$ 1/min | $h_{dip}$ mm | $T_W$ ° C. | T ° C. | $\dot{m}_{disp}$ kg/h | $w_{polymer,ex}$ kg/kg | $w_{H2O}$ (of M) kg/kg | P kg/kg | Haze before | Haze 70° C. | Haze 80° C. | $G^*$ cm/h |
|---|---|---|---|---|---|---|---|---|---|---|---|---|
| 4.1 | 0.55 | 135 | −9 | 78 | 7 | 25% | 11% | 96% | 2% | 7% | 9% | 11 |
| 4.2 | 0.55 | 135 | −9 | 76 | 7 | 20% | 18% | 94% | 2% | 12% | 15% | 11 |
| 2.2 | 0.55 | 135 | −9 | — | 7 | 41% | 10% | 92% | 2% | 59% | 75% | 11 |

TABLE 5

Operational parameters and experimental results of Inventive Example 5

| No. | $n_W$ 1/min | $h_{dip}$ mm | $T_W$ °C. | $n_R$ 1/min | $T_D$ °C. | $p_D$ bar | $\dot{m}_D$ kg/h | $\dot{m}_{H2O}$ kg/h | $\dot{m}_{disp}$ kg/h | T °C. | $W_{H2O}$ (of M) kg/kg | P kg/kg | ΔT °C. | T min. | G* cm/h |
|---|---|---|---|---|---|---|---|---|---|---|---|---|---|---|---|
| 5.1 | 0.55 | 135 | −9 | 89 | 158 | 5 | 2.0 | 3.4 | 7.0 | 83 | 27% | 89% | −27 | 20 | 10 |
| 5.2 | 0.55 | 135 | −9 | 89 | 159 | 5 | 1.9 | 3.4 | 6.9 | 85 | 25% | 90% | −25 | 19 | 10 |
| 5.3 | 0.55 | 135 | −9 | 90 | 158 | 5 | 1.9 | 3.4 | 6.9 | 87 | 18% | 93% | −23 | 20 | 10 |
| 5.4 | 0.55 | 135 | −9 | 90 | 158 | 5 | 2.6 | 3.4 | 6.4 | 91 | 13% | 96% | −19 | 20 | 9 |
| 5.5 | 0.55 | 135 | −9 | 90 | 158 | 5 | 3.3 | 3.4 | 6.5 | 96 | 9% | 97% | −14 | 19 | 10 |

| Formula sign | Unit | Meaning |
|---|---|---|
| $b_W$ | m | Width of roll |
| $d_i$ | m | Internal diameter of stirred tank |
| $d_{i,Z}$ | m | Internal diameter of centrifuge |
| $d_R$ | m | Diameter of stirrer |
| G | cm/h | Freezing rate by Equation (1) |
| G* | cm/h | Freezing rate of Equation (2) |
| $h_{dip}$ | mm | Immersion depth of roll |
| $h_{ice}$ | cm | Thickness of ice layer |
| $h_Z$ | m | Height of centrifuge |
| $m_{H2O}$ | kg | Mass of water |
| $m_{H2O,\,mech}$ | kg | Mechanically removed amount of water/aqueous phase |
| $m_{H2O,\,tot}$ | kg | Entire amount of water (sum total of water/aqueous phase from the originally used aqueous polymer dispersion plus the added water and/or water vapor) |
| $m_{polymer}$ | kg | Mass polymer |
| $m_Z$ | kg | Load level of centrifuge |
| $\dot{m}_{Disp}$ | kg/h | Mass flow of dispersion |
| $\dot{m}_{Eis}$ | kg/h | Mass flow of dispersion ice |
| $\dot{m}_{H2O}$ | kg/h | Mass flow of water |
| M | | Residually moist material |
| $M_{dry}$ | | Dried material |
| $n_R$ | 1/min | Speed of stirrer |
| $n_W$ | 1/min | Speed of roll |
| $n_Z$ | 1/min | Speed of centrifuge |
| P | kg/kg | Separation factor |
| $p_D$ | bar | Pressure of steam |
| $r_W$ | m | Radius of roll |
| $t_{freeze}$ | h | Freeze time |
| $t_{dip}$ | h | Immersion time |
| T | °C. | Sintering temperature |
| $T_D$ | °C. | Temperature of steam |
| $T^G$ | °C. | Glass transition temperature of outer shell/layer of dispersed polymer material |
| $T_{TS}$ | °C. | Temperature of drying cabinet |
| $T_W$ | °C. | Temperature of roll/evaporator |
| $U_{dip}$ | m | Immersed circumference of roll |
| $U_W$ | m | Circumference of roll |
| V | L | Fillable volume of stirred tank |
| $w_{H2O}$ | kg/kg | Residual moisture content |
| $w_{polymer}$ | kg/kg | Solids fraction (=polymer) of the dispersion |
| $w_{polymer,\,out}$ | kg/kg | Solids fraction (=polymer) of the dispersion after water and/or water vapor admixture |
| $\rho_{ice}$ | kg/m³ | Density of dispersion ice |
| τ | min | Residence time in stirred tank |
| $\tau_Z$ | min | Centrifugation time |
| $\tau_{TS}$ | min | Residence time in drying cabinet |
| $\tau_{WS}$ | min | Spin time of centrifuge |

The invention claimed is:

1. A continuous or semi-continuous freeze coagulation process for an aqueous polymer dispersion, comprising:
   freezing the aqueous polymer dispersion;
   performing a solid-liquid separation; and
   admixing water, water vapor, or both to the aqueous polymer dispersion between the freezing and performing the solid-liquid separation;
   wherein the solid-liquid separation is defined by a separation factor P as per the formula $$P = \frac{m_{H2O,mech}}{m_{H2O,tot}}$$

wherein $m_{H2O,mech}$ represents an amount of water mechanically removed from the aqueous polymer dispersion during the solid-liquid separation and $m_{H2O,tot}$ represents a total amount of water resulting from a summing of an amount of water from the aqueous polymer dispersion before the freezing and the water, water vapor, or both admixed with the aqueous polymer dispersion after the freezing; and
   wherein P is greater than or equal to 0.55.

2. The process according to claim 1, wherein the freezing is effected at a freezing rate G $$G = \frac{h_{ice}}{t_{freeze}}$$

wherein $h_{ice}$ represents the thickness of an ice layer formed within a time $t_{freeze}$; and
   wherein G is in the range of 1-100 cm/h.

3. The process according to claim 1 wherein the freezing is effected on a cooled rotating roll, wherein the roll dips into the aqueous polymer dispersion to be frozen.

4. The process according claim 1, wherein at least 90%, by weight of the total weight of the aqueous polymer dispersion is in a frozen state after the freezing.

5. The process according to claim 1, wherein the aqueous polymer dispersion is an aqueous (meth)acrylate polymer dispersion.

6. The process according to claim 1, wherein the aqueous polymer dispersion after the admixing has a weight-specific solid fraction in the range of 10%-99.5% of the weight-specific solid fraction of the aqueous polymer dispersion before the admixing.

7. The process according to claim 1, wherein the process further comprises thawing, or thawing and sintering.

8. The process according to claim 1, wherein the process further comprises sintering, wherein the sintering is effected at a sintering temperature T in the range of $T \geq T^G - 50$ K, wherein $T^G$ represents a glass transition temperature of a polymer of the aqueous polymer dispersion.

9. The process according to claim 1, further comprising compounding, under optional admixing of a further additive after performing the solid-liquid separation;
   wherein the further additive if admixing is selected from the group consisting of (meth)acrylate (co)polymers, UV stabilizer packages, lubricants, dyes, processing aids, antioxidants, stabilizers, and mixtures thereof.

10. The process according to claim 9, further comprising drying, compacting, or both between performing the solid-liquid separation and the compounding.

11. The process according to claim wherein a resulting product of the process is a semi-finished transparent product.

12. The process according to claim 1, wherein the solid-liquid separation obtains a polymer product that has a haze value of less than 20% after a hot water storage at a temperature of 80° C.

13. The process according to claim 2, wherein the freezing rate G is in the range of 8-15 cm/h, the separation factor P is greater than or equal to 0.90, and the solid-liquid separation obtains a polymer product that has a haze value of less than 20% after a hot water storage at a temperature of 80° C.

14. The process according to claim 5, wherein the aqueous polymer dispersion comprises one or more impact modifiers.

15. The process according to claim 1, further comprising compounding and admixing of a further additive after performing the solid-liquid separation;
    wherein the further additive if admixing is selected from the group consisting of (meth)acrylate (co)polymers, UV stabilizer packages, lubricants, dyes, processing aids, antioxidants, stabilizers, and mixtures thereof.

* * * * *